United States Patent
Avidor et al.

(10) Patent No.: US 7,239,879 B2
(45) Date of Patent: Jul. 3, 2007

(54) OPPORTUNISTIC BEAMFORMING AND SCHEDULING OF USERS IN A COMMUNICATION SYSTEM

(75) Inventors: Dan Avidor, Little Silver, NJ (US); Jonathan Ling, North Brunswick, NJ (US); Constantinos B. Papadias, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 472 days.

(21) Appl. No.: 10/721,098

(22) Filed: Nov. 26, 2003

(65) Prior Publication Data

US 2005/0113116 A1 May 26, 2005

(51) Int. Cl.
*H04Q 7/20* (2006.01)
(52) U.S. Cl. ............... 455/456.5; 455/561; 455/452.2; 455/450; 455/25
(58) Field of Classification Search ............ 455/25, 455/450, 561; 300/321, 349
See application file for complete search history.

(56) References Cited

U.S. PATENT DOCUMENTS

| | | | |
|---|---|---|---|
| 6,377,558 B1 * | 4/2002 | Dent | 370/321 |
| 2001/0034236 A1 * | 10/2001 | Tong et al. | 455/450 |
| 2002/0086708 A1 * | 7/2002 | Teo et al. | 455/561 |
| 2003/0142658 A1 | 7/2003 | Ofuji et al. | |
| 2003/0181163 A1 * | 9/2003 | Ofuji et al. | 455/25 |
| 2004/0063468 A1 * | 4/2004 | Frank | 455/561 |
| 2004/0100941 A1 * | 5/2004 | Lim et al. | 370/349 |

FOREIGN PATENT DOCUMENTS

| | | |
|---|---|---|
| WO | EP 1294106 A1 | 3/2002 |
| WO | EP 1335618 A2 | 2/2003 |
| WO | EP 1335618 A3 | 2/2003 |

OTHER PUBLICATIONS

Viswanath P., "Opportunistic Beamforming Using Dumb Antennas" Transactions on Information Theory, Inc., New York, vol. 48, No. 6, Jun. 2002.
European Search Report dated Apr. 27, 2005.

* cited by examiner

*Primary Examiner*—Joseph Feild
*Assistant Examiner*—David Q. Nguyen

(57) ABSTRACT

In a method of determining a beam to be generated for a user, a user may be selected from a user population based on a parameter that is tracked for each user in the user population, and a beam preferred by the selected user may be determined. The preferred beam may be generated and used by a base station to transmit a pilot signal to the user population. Each user of the user population responds to the pilot signal. The base station may run a scheduling algorithm and schedule a user based on feedback received from all the users in the user population, and information may be transmitted to the scheduled user using the preferred beam.

13 Claims, 6 Drawing Sheets

OPPORTUNISTIC BEAMFORMING AND SCHEDULING OF USERS IN A COMMUNICATION SYSTEM

BACKGROUND OF THE INVENTION

1. Field of the Invention

The present invention relates to beam generation and scheduling of users in a communication system.

2. Description of Related Art

Opportunistic scheduling (OS) has been proposed as a scheduling technique to improve the downlink throughput of high speed packet systems. OS (as employed in a base station scheduler or scheduling algorithm, for example) exploits the fact that the propagation channels between the base station and the MSs served by the base station fade independently. This independent fading gives rise to what is referred to as multi-user diversity (MUD). Multi-user diversity is a form of diversity that schedules transmissions to users, when their time varying channels approach their top capacity, thus increasing the throughput of the system.

OS exploits the fact that many data services are delay tolerant. However, real time services such as voice, and in some cases video, can accept only a limited amount of packet delay, thus a scheduler should also consider packet delay statistics. Additionally, the issue of fairness should be addressed. Accordingly, a scheduler or scheduling algorithm implementing OS should weigh desired system throughput with fairness and delay statistic considerations.

Several schedulers or scheduling algorithms have been developed in an effort to provide reasonable tradeoffs between throughput, delay statistics and fairness. A scheduler known as a proportional fair (PF) scheduler has been developed to provide improved throughput and fairness over the downlink of the High Data Rate (HDR) standard. It has been shown that the PF scheduler maximizes the sum of the logarithms of the MS's average throughput. In another scheduler, a fraction of timeslots allocated to each user can be arbitrarily chosen based on desired objectives (such as meeting desired Quality of Service (QoS) requirements), and the scheduler then maximizes the average system throughput under the time allocation constraints. A further scheduling algorithm, known as a Modified Largest Weighted Delay First algorithm, supports n MSs with desired Quality of Service (QoS) based on the expression: $P_r\{W_i > \tau_i\} \leq \delta_i$, i=1, . . . ,n. In the above expression $W_i$ is the packet delay for MS i, $\tau_i$ represents a delay threshold, and $\delta_i$ represents the maximum probability of exceeding the delay threshold, respectively.

Each of the above exemplify schedulers or scheduling algorithms employ OS techniques. However, when the coherence time of the propagation channels is long in comparison with an acceptable packet delay, or when the fading is weak (e.g., Ricean fading with high K factor), OS is not useful.

Accordingly, to address the slow channel or weak fading scenarios, a scheduling technique know as Opportunistic Beamforming (OBF) has been proposed. OBF is a "natural" enhancement to OS that, in general, amounts to replacing a base station having a single antenna with multiple antennas and implementing an algorithm that generates a different radiation pattern, henceforth referred to as a 'beam', every timeslot. The sequence of beams may be completely random and a-periodic, or could be chosen pseudo-randomly, from a fixed pre-designed collection of N beams. OBF techniques may be distinguished from other proposed downlink beamforming systems by the simplicity of the techniques. For example, and similar to OS, OBF requires a small amount of uplink feedback, while the beam generating algorithm runs independently, i.e., does not receive any information from the rest of the system.

Communication systems employing OBF techniques have been considered in two different environments, an uncorrelated environment and a correlated environment. In an uncorrelated environment, propagation channels between a MS and any of the BS's antennas are all uncorrelated. A realistic system comes close to this case when the antennas of each BS are placed sufficiently apart (e.g., 10 feet at 2 GHz) and there is some scattering in the environment. In a correlated environment, the propagation channels between any MS and all the antennas of a single BS are highly correlated, but channels to different BSs are uncorrelated. A realistic system comes close to this case when the BS's antennas are placed close to each other, (e.g., one half wavelength apart), and the angle spread at the BS is low. As it has been shown that, in general, a correlated system outperforms an uncorrelated system, the correlated system is therefore of focus herein.

In currently developed OBF techniques, high throughput and good delay properties are conflicting objectives. Studies on OBF techniques have primarily focused on the scheduling algorithm alone, while the beam generating algorithm for a correlated system was taken to be a simple periodic scanning of the desired cell/sector. The beam generating algorithm was running independently from the scheduler, and no attempt has been made to use system state information to modify the beam sequence in any way. A joint study on beamforming and scheduling has not heretofore believed to have been conducted.

SUMMARY OF THE INVENTION

An exemplary embodiment of the present invention is directed to a method of determining a beam to be generated for a user. A user may be selected from a user population based on a parameter that is tracked for each user in the user population, and a beam preferred by that selected user may be determined. The preferred beam may be generated and used by a base station to transmit a pilot signal to the user population. Each user of the user population responds to the pilot signal The base station may run a scheduling algorithm and schedule a user based on feedback received from all the users in the user population, and information may be transmitted to the scheduled user using the preferred beam.

BRIEF DESCRIPTION OF THE DRAWINGS

The present invention will become more fully understood from the detailed description given herein below and the accompanying drawings, wherein like elements are represented by like reference numerals and prime and multiple prime notation indicates similar elements in alternate embodiments, which are given by way of illustration only and thus are not limitative of the present invention and wherein.

DETAILED DESCRIPTION OF THE EXEMPLARY EMBODIMENTS

Figure 1:
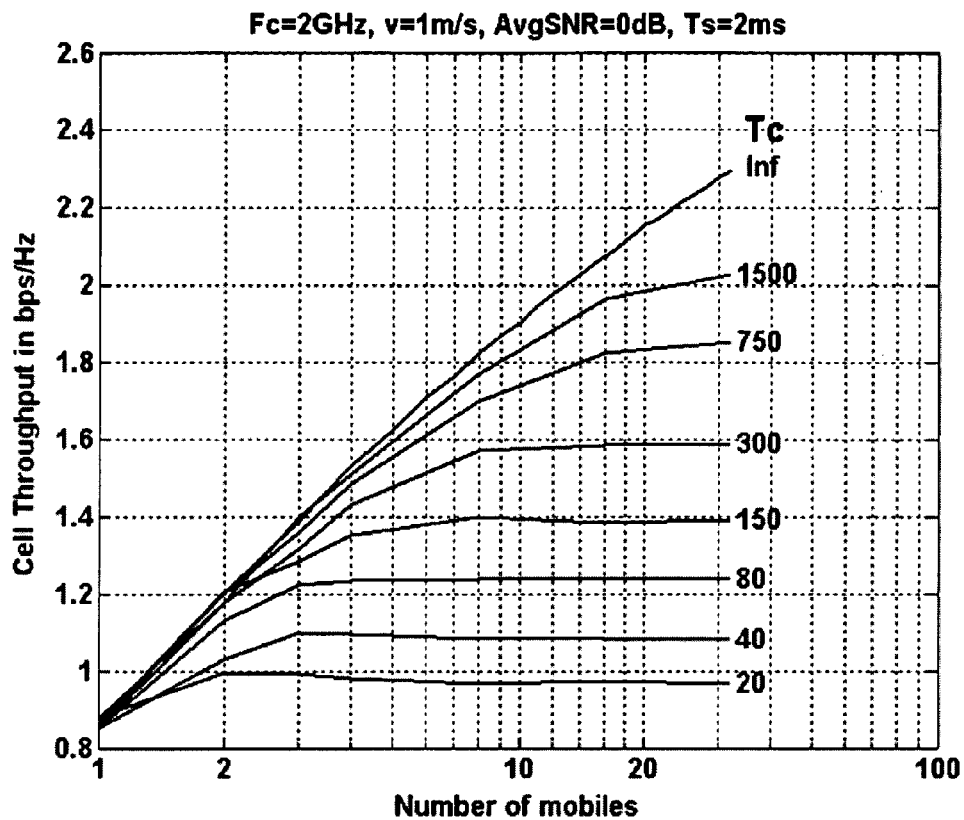
FIG. 1 is a graph demonstrating the effect of the number of MSs and $T_c$ on system throughput of a proportional fair (PF) scheduling algorithm.

Although the principles of the invention are well-suited for wireless communications systems based on the well-known High Speed Downlink Packet Access (HSDPA) specification in the Universal Mobile Telecommunication System (UMTS) standard, and may be described in this exemplary context, it should be noted that the exemplary embodiments shown and described herein are meant to be illustrative only and not limiting in any way. As such, various modifications will be apparent to those skilled in the art for application to wireless communication systems or networks based on 3G-1× EV-DO, 3G-1× EV-DV, UMTS technologies and/or currently developing fourth generation wireless communications systems that may currently support or be adapted so as to support beamforming and scheduling functions, for example, and are contemplated by the teachings herein.

Where used below, the term 'user' is synonymous to a mobile station (MS), user equipment (UE), subscriber, subscriber user, access terminal, remote station, etc., and describes a user of wireless resources in a wireless communication network. Frequently herein, user and mobile station may be interchangeably used. The term base station (also known as a Node-B) describes equipment that provides data connectivity between a network and one or more mobile stations. A system or network (such as an access network) may include one or more base stations. The term 'beam' represents a specific radiation pattern generated by a base station.

As used herein, the terms signal-to-interference ratio (SIR) and signal-to-noise ratio (SNR) are used interchangeably and represents a ratio of signal amplitude to the amount of interference (or noise) at a given time.

The exemplary embodiments are directed to an opportunistic beamforming method that may be used in conjunction with existing scheduling methods to improve system throughput while reducing user packet delay. To determine the preferred beam for a MS, the BS processes past reports (over time) received from the MS in response to pilot signals transmitted by the BS.

However, before discussing methods of beamforming and scheduling in further detail, the inventors provide a discussion of exemplary scheduling routines, an exemplary system model used for simulations of the methods of the present invention, and briefly discuss concepts of fairness and waiting time in order to place the exemplary embodiments of the present invention into better context.

Scheduling Algorithms

Hereafter, the terms 'scheduler' and/or 'scheduling algorithm' may be used to describe a particular scheduling technique, it being understood that a scheduler or scheduling algorithm may be implemented both in hardware and/or software. Accordingly, these terms may be used interchangeably. Additionally, the term beam, as previously described above, represents a specific radiation pattern generated by a base station.

There are may possible choices for the scheduling algorithms. One of the simplest scheduling algorithms is commonly referred to as round robin (RR) scheduling. Round robin scheduling is classic time division multiplexing, where the delay between successive transmissions to the same mobile station (MS) is fixed and equal for all MSs. A round robin scheduler runs autonomously and does not require any feedback in the form of channel state information. In contrast, max-rate scheduling, which always transmits to the MS that is capable of receiving at the highest data rate, yields the highest possible system throughput, but ignores fairness and delay altogether. PF scheduling algorithm, has been shown to have desirable properties. Accordingly, a version of the PF scheduler is now described, and is envisioned as operating in combination with a beamforming method in accordance with the exemplary embodiments, it being understood that scheduling algorithms other than the following PF scheduler may be applicable herein. The PF scheduler discussed below is described in further detail in an article by Viswanath et al., entitled "Opportunistic Beamforming Using Dumb Antennas", IEEE Trans. On Information Theory, vol. 48, No. 6, June, 2002.

PF Scheduler

Let $T_i(n)$ denote the running average throughput of MS i at the beginning of timeslot n, and let $J_n \in \{1, \ldots, n_M\}$ denote the MS chosen for transmission in timeslot n, where $n_M$ is the number of MSs the BS supports ($n_M$ is treated as a fixed number, but may change from time to time as the algorithm is running). Then the running average throughput of MS i at timeslot $T_i(n+1)$ may be described by expression (1):

$$T_i(n+1) = \begin{cases} (1-1/T_c)T_i(n) + R_i(n)/T_c & ; i = J_n \\ (1-1/T_c)T_i(n) & ; i \neq J_n \end{cases} \quad i = 1, \ldots, n_M; n = 0, 1, \ldots \qquad (1)$$

In expression (1), $T_i(0)=\delta_i$, where $\delta_i$ is a some given initial value, and $T_c$ is a free parameter that determines the effective memory of a throughput averaging filter of the scheduler. From expression (1) it may be seen that a large $T_c$ corresponds to a large effective memory for the filter, and vice versa.

Accordingly, a scheduling decision implemented by a BS running a PF scheduler may be described by expression (2), where, in a timeslot n, the BS schedules a MS $J_n$ satisfying:

$$J_n = \arg\max_{i \in \{1,\ldots,N_M\}} \frac{R_i(n)}{T_i(n)}, n = 0, 1, 2, \ldots \quad (2)$$

In other words, expression (2) says that the BS transmits to the MS i having the largest $R_i(n)/T_i(n)$ ratio. Including the term $T_i(n)$ in the denominator means that MSs that have lately been "starved" (e.g., have not received a packet for a unusually large number of timeslots) are given relative priority in the scheduling process. When MS i is scheduled for transmission, transmission is made at rate $R_i(n)$. It has been shown that the stochastic process $\{J_n\}_{n=0}^{\infty}$ is a Markov chain having a steady state distribution:

$$\pi_i \equiv \lim_{n \to \infty} P\{J_n = i\}, i = 1, \ldots, N_M,$$

where $\pi_i$ is the long-term fraction of time allocated to MS i.

The PF scheduling algorithm exhibits the following features: (a) the system throughput rises with the number of MSs up to a limit imposed by $T_c$ and the velocity of the MSs; (b) the system's throughput increases with $T_c$, but, for a fixed number of MSs, the rate of throughput gain saturates as $T_c$ keeps growing; and (c) as $T_c$ grows, longer delays start appearing between successive transmissions to the same MS.

FIG. 1 is a graph demonstrating the effect of the number of MSs and $T_c$ on system throughput of a proportional fair (PF) scheduling algorithm. In FIG. 1, simulated cell throughput is shown as a function of the number of MSs, based on a timeslot (Ts) of 2 ms, SNR for all of the MSs of 0 dB, mobile velocity of 1 ms and RF carrier frequency (Fc) of 2 GHz. As shown in FIG. 1, the system throughput rises with the number of MSs up to a limit imposed by $T_c$ and the velocity of the MSs.

Figure 2:
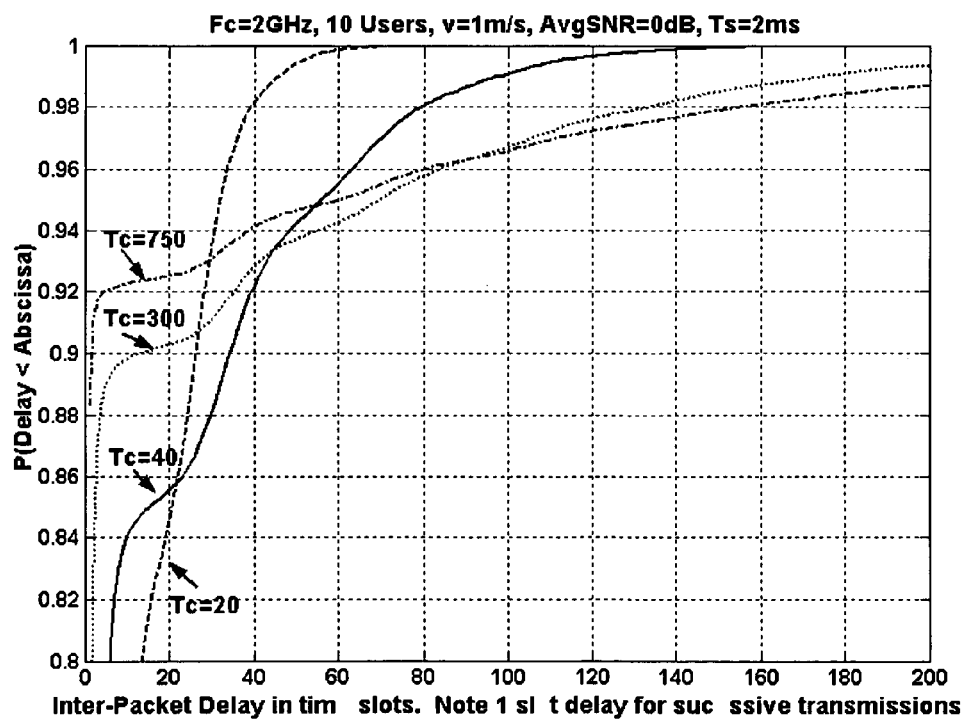
FIG. 2 is a graph illustrating a cumulative distribution function (CDF) of inter-packet delay in timeslots determined by the PF algorithm for different values of a parameter $T_c$.

FIG. 2 is a graph illustrating a cumulative distribution function (CDF) of inter-packet delay in timeslots determined by the PF algorithm for different values of the parameter $T_c$. In particular, FIG. 2 demonstrates that the probability of long inter-packet delays (multiples of the mean inter-packet delay) rises with $T_c$. In FIG. 2, the y-axis is the probability that the delay will not exceed the corresponding number of timeslots on the x-axis) FIG. 2 has the same parameters with regard to average SNR, timeslot duration and mobile velocity as in FIG. 1. In FIGS. 1 and 2 the relationship $R_i(n)=\log_2(1+SIR(n))$, and Rayleigh fading were assumed.

System Model

To facilitate an understanding of the beamforming and scheduling methods to be described hereafter, the inventors have developed the following exemplary system model. However, it should be understood that the system model described below is merely just one possible system model; other system models may be applicable as is understood in the art:

(a) Each channel is subjected to correlated Rayleigh fading process, which is tied to the velocity of the MS as, described at page 55 of the book by G. L. Stuber, entitled "Principles of Mobile Communication, Kluwer Academic Publisher, 1966, pp. 52-55. The sequence of correlated Rayleigh variables may be chosen independently for each MS. This is accomplished using a suitable method such as is described in the article to Young et al, entitled "The Generation of Correlated Rayleigh Random Variates by Inverse Fourier Transform", IEEE Trans. On Comm. Vol. 48, NO. 7, July 2000.

(b) The mean attenuation of each channel, i.e., when the Rayleigh fading is filtered out, is fixed over the simulation run.

(c) unless otherwise specified, the MSs are placed randomly and uniformly over the area of the covered sector. This selection process is repeated independently for each simulation run.

(d) The BS transmits at full power.

(e) The input buffers at the BS, one per MS, always contain data waiting to be transmitted. In other words, the delay experienced by packets on their way to the BS, or when waiting in a buffer is ignored.

(f) For reasons of simplicity, irrespective of the transmission rate, exactly one packet of information is transmitted in a single timeslot.

(g) The estimation of R(n) is done with zero error, and the MSs' reports are perfectly received at the BS without delay. Data packets are always received correctly.

Fairness and Waiting Time

The concept of fairness may be commonly associated with $\pi_i$, the long term fraction of time allocated to each MS. For example, in the round robin scheduler this fraction is $\pi_i=1/n_M$, i=1, \ldots, $n_M$, and the delay is fixed and equal to $n_M$ timeslots. Under the assumption: $R_i(n) \propto SNR_i(n)$, i=1, \ldots, $n_M$ and when the propagation channels to all MSs are stationary, independent and identically distributed processes up to an arbitrary scale factor, the PF algorithm possesses the fairness property: $\pi_i=1/n_M$, irrespective of the mean SIR of the MS. However, in general the above is not correct.

Figure 3:
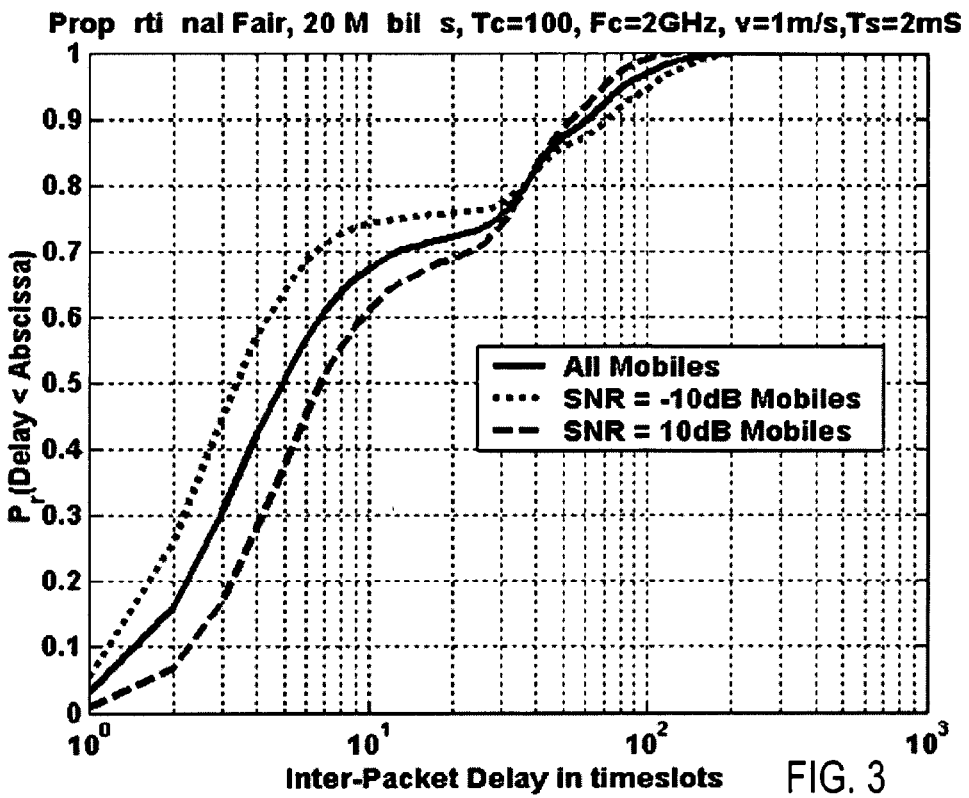
FIG. 3 is a graph illustrating a cumulative distribution function (CDF) of inter-packet delay for two equal-sized MS populations.

FIG. 3 is a graph illustrating a cumulative distribution function (CDF) of inter-packet delay for two equal-sized MS populations. In particular, FIG. 3 shows a CDF of inter-packet delay when the MS population includes two equal groups, one group with a mean SIR equal to 10 dB, and the other group with a mean SIR of -10 dB. The CDF was obtained by simulations with the PF algorithm under the following assumption: $R_i(n)=\log_2(1+SIR_i(n))$, i=1, \ldots, $n_M$; other parameters are 20 MSs, $T_c=100$, average SNR of 0 dB, mobile velocity of 1 ms and RF carrier frequency (Fc) of 2 GHz.

As evident in FIG. 3, in terms of longer delay (particularly for inter-packet delay at or greater than about 40 timeslots), the 'weaker' group (mean SIR of -10 dB Group) is significantly worse off than the 'stronger' group (mean SIR of 10 dB). For example, the probability of delay exceeding 100 timeslots ($10^2$ on x-axis) for the stronger group is about only 1%, whereas the probability of mobiles in the weaker group having an inter-packet delay exceeding 100 timeslots is almost 6%.

This inter-packet delay may be referred to as 'waiting time'. Waiting time may be understood as the number of timeslots since a MS has received its last packet. The BS serving a group of MSs in a particular cell may track the waiting time for each MS that it serves in the cell. As will be seen below, in a given timeslot, a 'longest waiting MS' may be selected and the beam it prefers generated. This has the effect of raising the probability that the selected MS will be picked by the scheduler for transmission in the current timeslot.

Opportunistic Beamforming (General)

As discussed above, OBF is a "natural" enhancement of OS which utilizes multiple antennas at the BS, and implements an algorithm that generates a different beam every timeslot. In a correlated environment, there is nothing to be gained from feeding BS's antennas unevenly (amplitude wise). The choice is therefore to feed each antenna with the same signal power, and use the feeding phases to point the beam as desired. The N beams used in the simulations were spaced uniformly across a sector of 120 degrees, where the peak of the first beam and the $N^{th}$ beam coincide with the boundaries of the sector.

Satisfying the QoS Requirements

It is widely accepted that satisfying quality of service (QoS) requirements of a typical MS amounts to providing sufficient average throughput, while satisfying certain packet delay constraints. Prior studies of OBF using a PF scheduler focused only on the system throughput, and throughput per MS, each as a function of the number of BS antennas and the number of MSs. Delay constraints were accounted for simply by making a proper choice of $T_c$. However, this leaves a lot to be desired, because controlling the delay and delay jitter by reducing $T_c$ leads to large throughput penalty. This is suggested by FIG. 1 for the OS case, for example. Other system parameters, such as dynamically changing size of the MSs population, the spread of MS's velocities and individual propagation channels, also affects the statistics of the packet delay and the time allocations for individual MSs, as well as average throughput.

Furthermore, the system under study (or 'subsystem' which may be characterized as a BS, the scheduler it is running, and the MSs the BS is serving) is typically just one contributor to the total end-to-end delay perceived by the MSs. To study delay performance, the ability to support MSs with sufficient regularity and fairness, it is necessary to de-couple the subsystem from the rest of the system. This may be done by assuming that the input buffers of the scheduler in the BS always contain data, and the time individual packets spend waiting in a buffer is ignored. That way, the individual packet arrival processes, which could be vastly different, do not affect scheduling decisions. Assuming that the individual fading processes for each MS are stationary, the delay constraint may be defined in terms of a probability that the running average throughput, measured over a given time window that may be set by the specific application, falls below a given threshold.

It should be observed that, when at least one packet is required to be received in any fixed length "square shaped" time window, the general requirement reduces to a time limit imposed on the inter-packet delay.

In this case, the delay performance may be measured in terms of the probability that inter-packet delay (delay between two successfully received packets) exceeds a certain threshold value. Occurrence of such an event may be referred to as a 'delay outage'. The mean waiting time may be easily determined merely by the number of MSs the BS supports ($n_M$). For example, if there are 10 MS, the mean waiting time is 10 timeslots (mean waiting time). As there is no way to change the mean waiting time, improving the delay performance amounts to shrinking the upper "tail" of the probability density function curves of the inter packet delay (the CDF is shown in FIGS. 2 and 3.

Beamforming and Scheduling Algorithms

In OBF systems, high throughput and good delay properties are conflicting objectives. As discussed above, in current OBF implementations, no attempt has been made to combine beam generating for the correlated system (e.g., multiple, closely-spaced antennas) with scheduling algorithms, as beam sequence generation was seen as running independently. Accordingly, for purposes of comparison, hereafter the current OBF techniques will be referred to as a "standard OBF" (sOBF) algorithm.

A method of determining a beam to be generated for a MS (and hence a scheduling method) in accordance with the exemplary embodiments or the present invention makes use of past MS reports. No additional reports, or feedback, are required from the MS. Modifying the scanning sequence, based on information available at the BS, may make it possible to improve system performance in terms of throughput and delay statistics.

A slow moving MS sends a substantial number of reports during a time interval where the propagation channel, with the fast fading averaged over, is practically unchanged. Thus, it is possible to identify the beam a MS "prefers" by averaging the reports the MS transmits in response to transmissions on each of the beams (assuming a moderate number of beams). The 'preferred beam' may be understood as the radiation pattern that has the highest average running data rate, or the corresponding SIR, for example, as indicated by the reports, or feedback, by the given MS to the BS. Accordingly, the BS may determine and generate the 'preferred beam' for a given MS based on the reports, or feedback, by the given MS to the BS, such as the reports a MS sends in response to a pilot signal transmitted by the BS, for example.

The following notation and conditions are introduced: for the following algorithms, there is a finite collection of N pre-selected beams: $\{b_1, b_2, \ldots, b_N\}$, and the expression $j(m) \in \{1, \ldots, N\}$ represents the index of the beam used in timeslot m for m=0,1, . . . , n−1 where n is the current timeslot.

Figure 4:
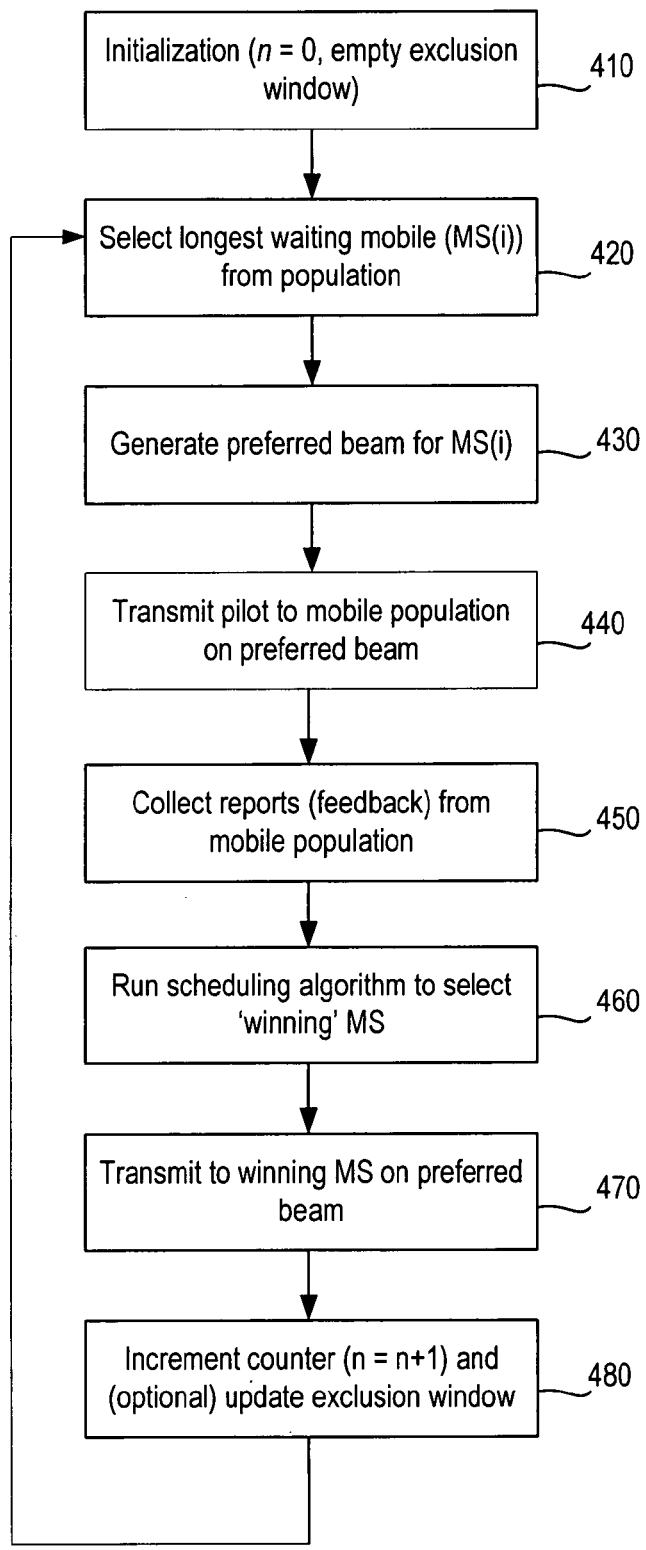
FIG. 4 is a flowchart describing methods of determining a beam to be generated for a MS and scheduling a MS to receive a transmission, in accordance with the exemplary embodiments of the present invention.

FIG. 4 is a flowchart describing a method of determining a beam to be generated for a MS in accordance with the exemplary embodiments of the present invention. The functions in FIG. 4 may be implemented by hardware or software, such as by a microprocessor or digital signal processor implementing a software routine, for example. The functions outlined in FIG. 4 may be also considered as describing a joint opportunistic beamforming and scheduling algorithm, and a modification of the current sOBF algorithm.

Referring to FIG. 4, on initialization (function 410) a timeslot counter n is initialized (n=0) and an exclusion window is emptied. In general, the exclusion window is a time window designed to prevent a beam from continually illuminating a MS having poor channel conditions, which could adversely affect system throughput. The exclusion window, which may be set at a fixed size or varied in size, is described in further detail below.

The BS tracks a common parameter of each MS it serves. This parameter could be the aforementioned 'waiting time' of the MS, i.e., the number of timeslots since the MS has received its last packet, for example. Alternatively, instead of waiting time, the BS could track a parameter such as the short term throughput of each MS, where an averaging, or filtering process, which is used to calculate the short term throughput, may be dictated by the application, and could be different for each MS. Further, the BS could track the short term throughput normalized by the long term throughput (or average throughput) of each MS it serves.

The BS selects (function 420) a MS from the MS population based on a tracked parameter. FIG. 4 illustrates the tracking of just the aforementioned longest waiting MS, it being understood that this is merely an exemplary trackable parameter; other parameters such as calculated short term throughput and short term throughput normalized by long term throughput for each MS could be tracked by the BS In the instant example, the BS selects the MS that is the most 'starved' in terms of when the last packet was received. Thus, a MS which is known by the BS as having waited the longest period of time to receive a given transmission (such as a packet) may be selected as the longest waiting MS. As shown in function 420, the longest waiting mobile which is not in the exclusion window is searched for in the mobile population at the beginning of timeslot n. This MS may be referred to as MS i(n) where i(n) is the MS index for the given timeslot n.

For the selected MS, a preferred beam may be determined (function 430) according to a preferred beam algorithm, to be described in further detail below. The preferred beam is selected from the aforementioned finite set of N pre-selected beams. Whenever a beam was used in the past to transmit a pilot signal, a report was transmitted by each MS back to the BS. The BS thus has collected past reports for any beam, sent by all MSs in the MS population.

As discussed above, for each of the N beams, the BS may average information in the reports the MS transmits in response to transmissions on each of the beams (assuming a moderate number of beams). Based on the collected reports, the 'preferred beam' may thus be the radiation pattern that has the highest average running data rate, or the highest corresponding average SIR, for example, as indicated by the reports of the MSs. Accordingly, the preferred beam for MS i(n) may be determined according to a preferred beam algorithm, an example of which is described below.

The BS then generates (function 430) the preferred beam and uses the preferred beam to transmit a pilot signal (function 440). The BS then receives reports from all MSs in the MS population it serves (function 450). Each of these reports may include an $R_i(n)$ term, which as discussed above with respect to the PF algorithm, represents an estimate of the maximum data rate the responding mobile is capable of receiving during the n th timeslot. Each MS in the MS population computes $R_i(n)$ by measuring the signal-to-interference ratio (SIR) of the pilot signal and then applies a desirable transformation, for example, such as Shannon's capacity formula $$R_i(n) = \log_2(1 + SIR(n)).$$

The scheduler at the BS then determines (function 460), based on the reports, which MS will receive a packet in the current timeslot. This may be done using the techniques described above with regard to the PF scheduler, so as to select a 'winning MS'.

The BS then proceeds to transmit data (function 470) to the to the MS $J_n$ selected by the scheduler in step 460 (which may, or may not be the MS selected in step 420) at the rate $R_{J_n}(n)$ (see equation (2) on the beam selected in step 430. The iteration is completed by updating the exclusion window and incrementing the timeslot counter for the next timeslot (function 490). The exclusion window is updated by pushing the index i(n), of the MS selected in function 420 into the exclusion window, thereby dropping the index i(n−L), which is the oldest index in the window, out of the exclusion window. Functions 420-490 may be repeated in subsequent timeslots.

The functions described in FIG. 4 may be performed in part or in total. For example, functions 410-430 and 490 may be performed as part of a beam determination routine to generate a preferred beam for another particular application other than scheduling or transmission for example. A method of scheduling may include generating a preferred beam in accordance with functions 410-430, yet a BS may transmit information to a scheduled user using a beam other than the preferred beam. A method of determining a preferred beam in accordance with the exemplary embodiments may be used with any type of scheduling algorithm; the PF scheduler is merely one exemplary scheduling algorithm.

Preferred Beam Algorithm

The preferred beam may be determined in accordance with the following 'preferred beam algorithm': The beam preferred by MS i at timeslot n is $b_j$ if:

$$j = \arg \max_{k \in \{1,2,\ldots,N\}} \left[ \frac{\sum_{m=0}^{n-1} R_{i(n)}(m)\delta(j(m), k)a^{n-m-1}}{\sum_{m=0}^{n-1} \delta(j(m), k)a^{n-m-1}} \right] \quad (3)$$

where:

$$\delta(l, k) \equiv \begin{cases} 1, & k = l; l, k \in \{1, \ldots, N\} \\ 0, & k \neq l \end{cases}$$

In expression (3), j(m) is the index of the beam that was generated by the BS in timeslot n. For those m where j(m)=k, δ=1. For example, if k=3, for all m's where the third beam was generated, δ=1, else δ=0. Expression (3) says: the preferred beam of MS i at timeslot n is the beam having the highest running average fed-back rates of mobile $^i$. In other words, evaluate each of the N beams one by one, looking for all past occurrences of the beam, and average past reports (or a chosen function of the reports), and pick the highest average. The denominator term δ(l,k) is provided to normalize the expression.

The parameter α, 0<α<1 is a "forgetting factor" allowing the preferred beam to track the location of the MS. The forgetting factor α should be small enough to allow MSs to track changes in their preferred beams, a process which, in macro-cells, is typically measured in seconds, while, at the same time sufficiently close to 1 to allow proper filtering of the fast fading. A good choice of α may be based on the de-correlation distance of the shadow fading, the physical size of the cell/sector and the MS velocity range of interest, for example (the de-correlation distance is the distance between two points, such that the correlation between the shadow fading components of the path loss between these points and the BS has decayed to some pre-selected value, e.g., to $e^{-1}$).

To save computing effort and memory, expression (3) can be calculated iteratively for each MS using information from previous timeslots, as illustrated in expressions (4)-(6):

Let:

$$A_{i,k}(n) \equiv \sum_{m=0}^{n-1} R_{i(n)}(m)\delta(j(m), k)a^{n-m-1} \quad (4)$$

$$= A_{i,k}(n-1)a + R_i(n-1)\delta(j(n-1), k),$$

$$i = 1, \ldots, N_M, k = 1, \ldots, N$$

and $$B_{i,k}(n) \equiv \sum_{m=0}^{n-1} \delta(j(m), k)a^{n-m-1} \quad (5)$$

$$= A_{i,k}(n-1)a + \delta(j(n-1), k),$$

$$i = 1, \ldots, N_M, k = 1, \ldots, N$$

Then:

$$j = \underset{k \in \{1,2,\dots N\}}{\mathrm{argmax}} \left[ \frac{A_{i(n),k}(n)}{B_{i(n),k}(n)} \right]. \quad (6)$$

The exclusion window L is an L dimensional vector, where L is at most $n_M-1$. Its jth component $L_j$ is either the index of any of the MSs, or zero. To assist in understanding the purpose of the exclusion window, imagine that L is set it zero, and MS i represents the longest waiting MS. The preferred beam algorithm will repeatedly determine (select) the beam that MS i prefers and will continue doing so in the next (and subsequent) timeslot(s) until MS i receives a packet, and thereby ceases to be the longest waiting MS. This has a negative effect on the system throughput.

The purpose of the exclusion window is therefore to prevent the beam from repeatedly illuminating a MS that is slow to recover from a "bad" channel. For slow moving MSs the longest possible exclusion window (L=$n_M-1$) appears to provide the best results; while for MSs moving at vehicular velocities, shorter windows (e.g., L=1) appear to perform better. It may be beneficial to adjust L so as to match the velocity of the MSs. However, it is not assumed that the BS knows the velocity of the MSs. It is therefore necessary to choose L with no knowledge of MSs' velocities. Nevertheless, good performance is obtained with widely spaced velocities, as will be shown in FIG. 6, described hereafter.

The number of beams (N) may affect performance of the modified OBF algorithm. In simulations by the inventors, N was chosen as N=11 so that beams overlap sufficiently, with small loss in system throughput. In the sOBF algorithm, increasing N increases the frequency of occurrence of long delays. In the modified OBF algorithm described herein, increasing N has no detrimental effect, as long as sufficient reports are available for each beam to enable the algorithm to efficiently filter out the fast fading, while still tracking the mean attenuation of the propagation channel (excluding the fast fading). This may require periodic deviations from the beam generating algorithm to insert "missing" beams, thereby ensuring that all N beams are exercised with minimal periodicity. As long as these deviations consume a small fraction of the timeslots, the resulting loss is minimal.

Other Measures of QoS and Delay

The method(s) described above have been devised in an effort to give priority to a MS "waiting longest" for a next packet. In a more general case, longer periods of service deterioration may be used as a metric to measure performance. A reasonable QoS requirement could be phrased so as to require a MS to have:

a) Sufficient long term (average) throughput; and
b) Short term drops in throughput should not occur too often, and should not be too deep. Quantitatively, (b) may require that the short term throughput fall below a fraction γ of the long term throughput in less than the fraction δ of timeslots.

The 'long term throughput', 'short term throughput' and the parameters γ and δ may vary (and be set) based on a given application. This is analogous to the often employed practice to measure the quality of a communications link not by bit error rate (BER), but by "bad minutes per day" for instance.

Defining the QoS objective this way changes the method of beam generation. Namely, instead of generating the beam preferred by the MS waiting the longest for the next packet, the preferred beam algorithm generates the beam preferred by the MS having the lowest ratio of short term throughput to long term (or average) throughput.

Simulations and Results

Figure 5:
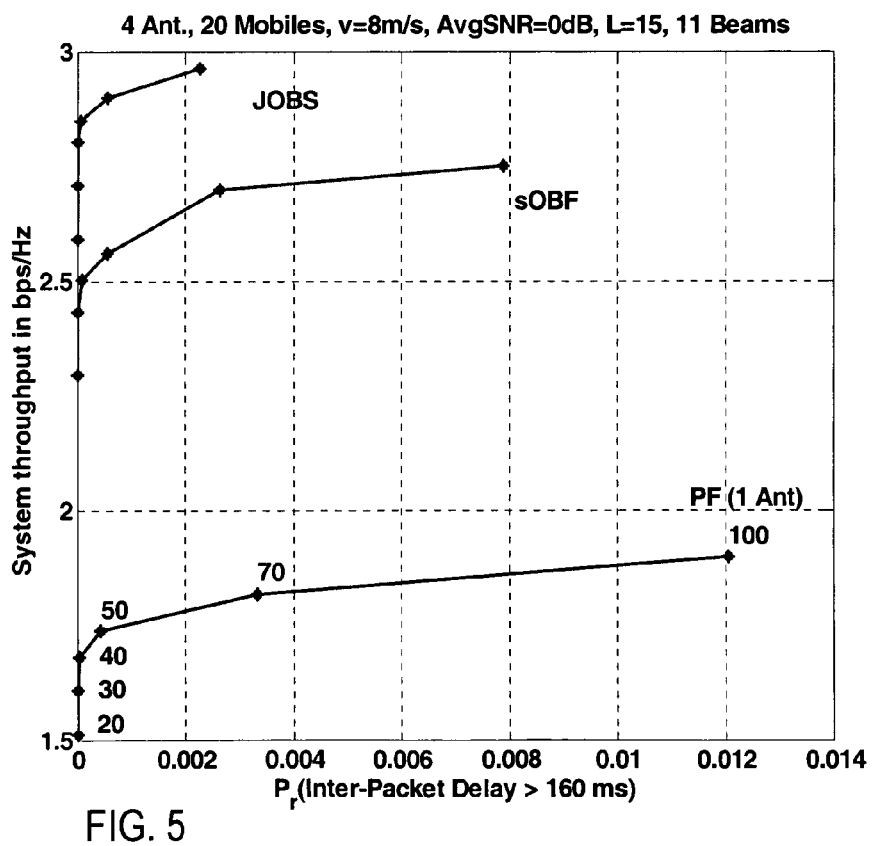
FIG. 5 is a graph illustrating system throughput versus a probability of delay outage for a fixed MS population in accordance with an exemplary embodiment of the invention.

FIG. 5 is a graph illustrating system throughput versus a probability of delay outage for a fixed MS population in accordance with an exemplary embodiment of the invention. FIG. 5 shows the system throughput versus the probability of delay outage with $T_c$ as a parameter.

In FIG. 5, the delay constraint (i.e., threshold value) is chosen to be 160 ms. For twenty MSs, this threshold value equals four times the mean delay of 40 ms. The throughput/delay curves of three systems are compared. The first, labeled "PF" is the PF algorithm with a single antenna. The second, labeled "sOBF" for standard OBF, is an OBF system with simple scanning of beams. The third curve, labeled "JOBS", is the method described with respect to FIG. 4 in accordance with the exemplary embodiments of the present invention. The label JOBS is merely an identifier and should not be construed to limit the exemplary embodiments in any way. In FIG. 5, both OBF systems use four antennas at the BS and generate the same set $\{b_1, b_2, \ldots b_{11}\}$ of beams, but in a different order. The mean SNR values for all MSs is fixed at 0 dB, the mobile velocity fixed at 8 m/sec, and the exclusion window L fixed at 15.

As discussed above, in accordance with the exemplary embodiments of the present invention, delay performance may be measured in terms of the probability that inter-packet delay exceeds a certain threshold value, where occurrence of such an event is known as a delay outage. As seen in FIG. 5, for a fixed mobile population and velocity, the probability of delay outage is much lower for JOBS than sOBF or PF algorithms. It may thus be seen that JOBS may enable a higher system throughput to be achieved while at the same time reducing the probability of excessive delay.

Figure 6:
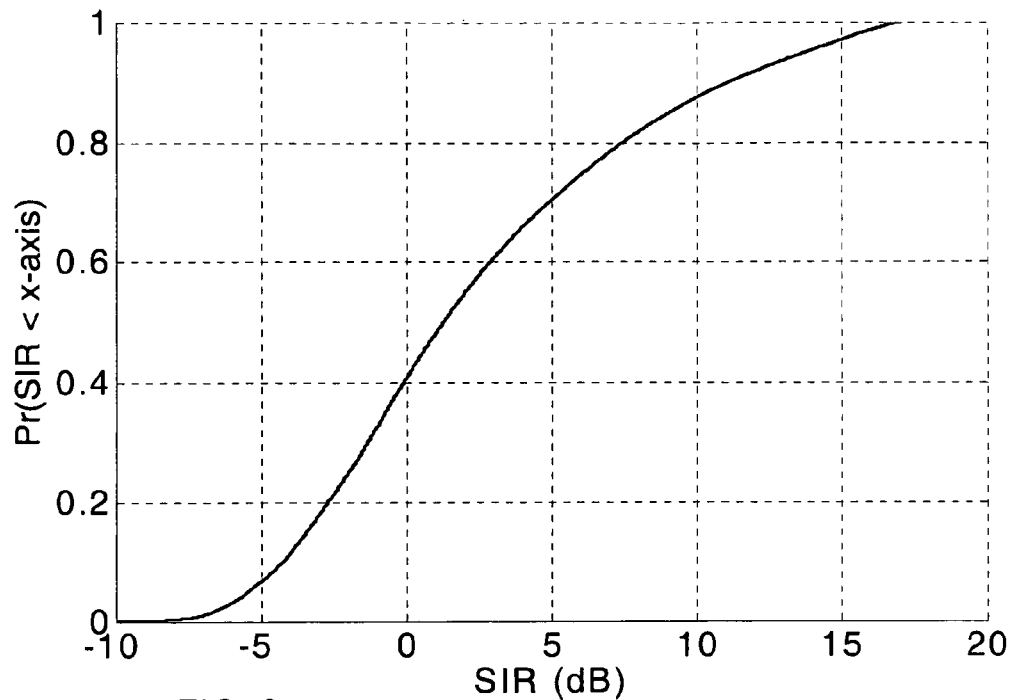
FIG. 6 is a graph illustrating a cumulative distribution function (CDF) of signal to interference ratio (SIR) in accordance with an exemplary embodiment of the invention.

FIG. 6 is a graph illustrating a cumulative distribution function (CDF) of signal to interference ratio (SIR) in accordance with an exemplary embodiment of the invention. The data for FIG. 6 was generated by placing MSs randomly and uniformly over the area of a cell. Two rings of interfering cells on a hexagonal grid were considered with all BSs transmitting continuously at equal power using omnidirectional antennas. For each MSs, the signal of the sector with the highest mean received power was considered the signal, while the remaining sectors contributed to the interference power.

The dB path loss, denoted $A_{j,i}$ between BS j and MS i (or any other BS, MS pair), was taken as the sum of two parts: $A_{j,i} = -35 \log d_{j,i} - \xi_{j,i}$ dB, where $d_{j,i}$ is the distance between BS j and MS i, and $\xi_{j,i}$ is the shadow loss of the j,i link. $\xi_{j,i}$ was taken as an independent (for each link), zero mean, Gaussian random variable with standard deviation σ=8 dB. The process was repeated a large number of times to establish the curve shown in FIG. 6.

Figure 7:
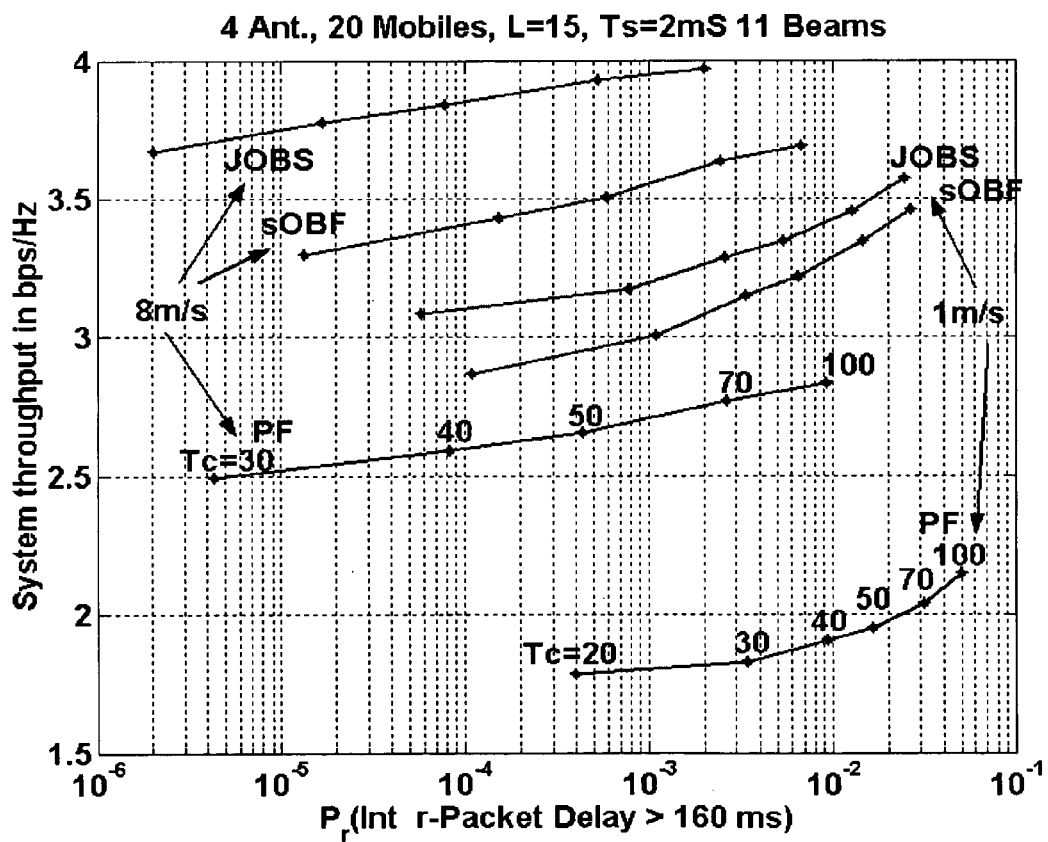
FIG. 7 is a graph illustrating system throughput versus delay outage in accordance with an exemplary embodiment of the invention.

FIG. 7 is a graph illustrating system throughput versus delay outage in accordance with an exemplary embodiment of the invention. FIG. 7 repeats the same experiment as shown in FIG. 5, but for two different velocities (common to all MSs). In this case the SIR for each mobile is chosen independently from the CDF shown in FIG. 6. FIG. 7 shows two cases: a first case where the velocity of all MSs is set to 1 m/sec; and a second case in which velocity of all MSs is 8 m/sec.

As briefly discussed above, it may be desirable that the exclusion window match the number of MSs and their velocity. However, since BSs typically do not know the velocities of the MSs they are serving, which in general are not equal, it was necessary to choose a certain fixed exclusion window L to use for all velocities. In FIG. 7 the exclusion window L was fixed at 15.

As shown in FIG. 7, JOBS performs better than sOBF and PF over both low and high velocities, but the gain is especially large at high velocities. The general trend for all three algorithms is that the delay outage deteriorates (rises) rapidly with increasing $T_c$ in the range shown, while the throughput shows small gain. Accordingly, from FIG. 7 it may be seen that JOBS enables achievement of higher throughput, while at the same time reducing the probability of excessive delay. Since $T_c$ is an arbitrary parameter, a desired trade-off between throughput and delay can be chosen so as to match the particular application.

Figure 8:
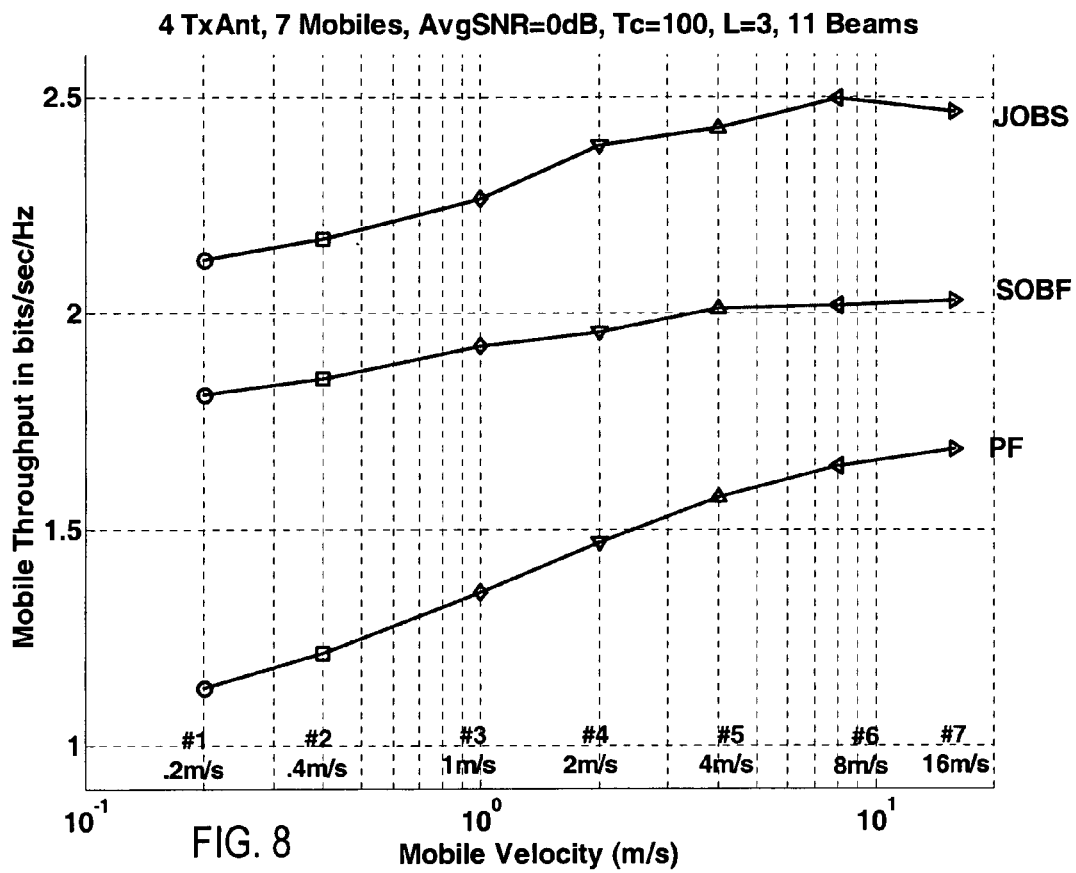
FIG. 8 is a graph illustrating MS throughput versus MS velocity in accordance with an exemplary embodiment of the invention.

FIG. 8 is a graph illustrating MS throughput versus MS velocity in accordance with an exemplary embodiment of the invention. To observe the throughputs of individual MSs with widely spread velocities under the OBF algorithms, different velocities were assigned to each MS in a seven MS system. The propagation channels are i.i.d. Referring to FIG. 8, it may be seen that faster MSs experience higher throughputs than slow MSs, but the differences are not large.

Figure 9:
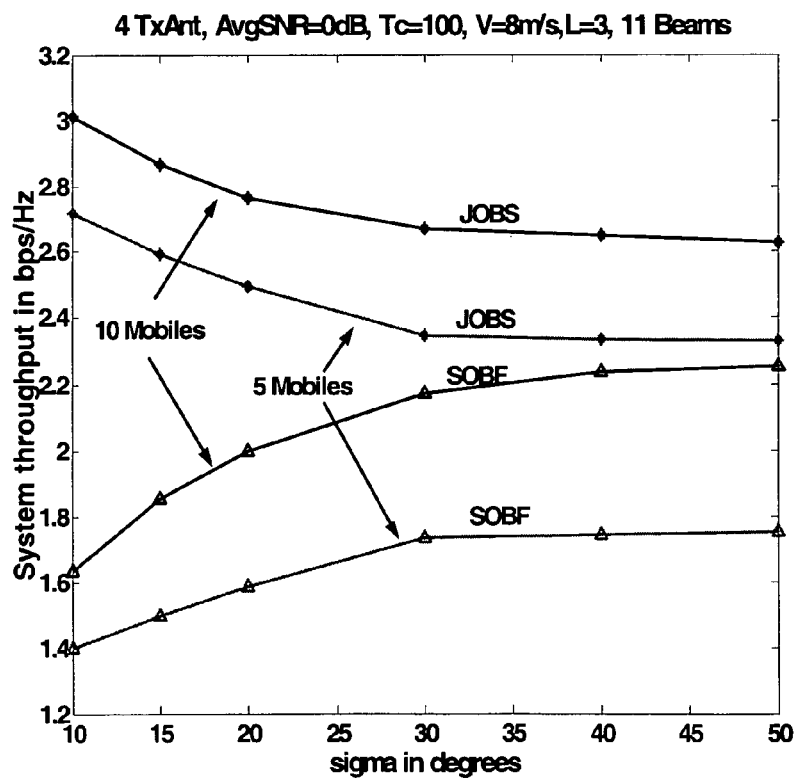
FIG. 9 is a graph illustrating system throughput versus the standard deviation of the azimuth of MSs with respect to the mean azimuth of the MSs.

FIG. 9 is a graph illustrating system throughput versus the standard deviation of the azimuth of MSs with respect to the mean azimuth of the MSs. In particular, FIG. 9 shows system throughput versus the extent of clustering of the MS population around a certain azimuth, as seen from the BS. The extent of clustering is measured by the standard deviation of the azimuth of MSs with respect to the mean azimuth of the MSs. The advantage of the JOBS algorithm over the sOBF algorithm may be more evident when the MSs are not distributed evenly over the area of the cell/sector, but concentrated in designated areas such as a mall or along a major highway, for example. The sOBF algorithm ignores the uneven distribution of MSs, and spends as many timeslots illuminating lightly loaded, or even empty subsectors, as it does illuminating heavily loaded areas.

On the other hand, the JOBS algorithm adapts itself to the MS's spatial distribution and avoids empty areas. To demonstrate this feature, the azimuth of each MS was chosen randomly and independently for each simulation run from a normal pdf: $N(\alpha, \sigma^2)$, (e.g., a random variable that has a Gaussian distribution with mean $\alpha$ and standard deviation $\sigma$) with the necessary truncation, wrapping around and scaling. For each simulation run the mean $\alpha$ was chosen randomly and uniformly within the sector boundaries. The system throughput obtained is shown in FIG. 9 as a function of the standard deviation $\sigma$. As evident from FIG. 9, JOBS does much better than sOBF when $\sigma$ is low.

Figure 10:
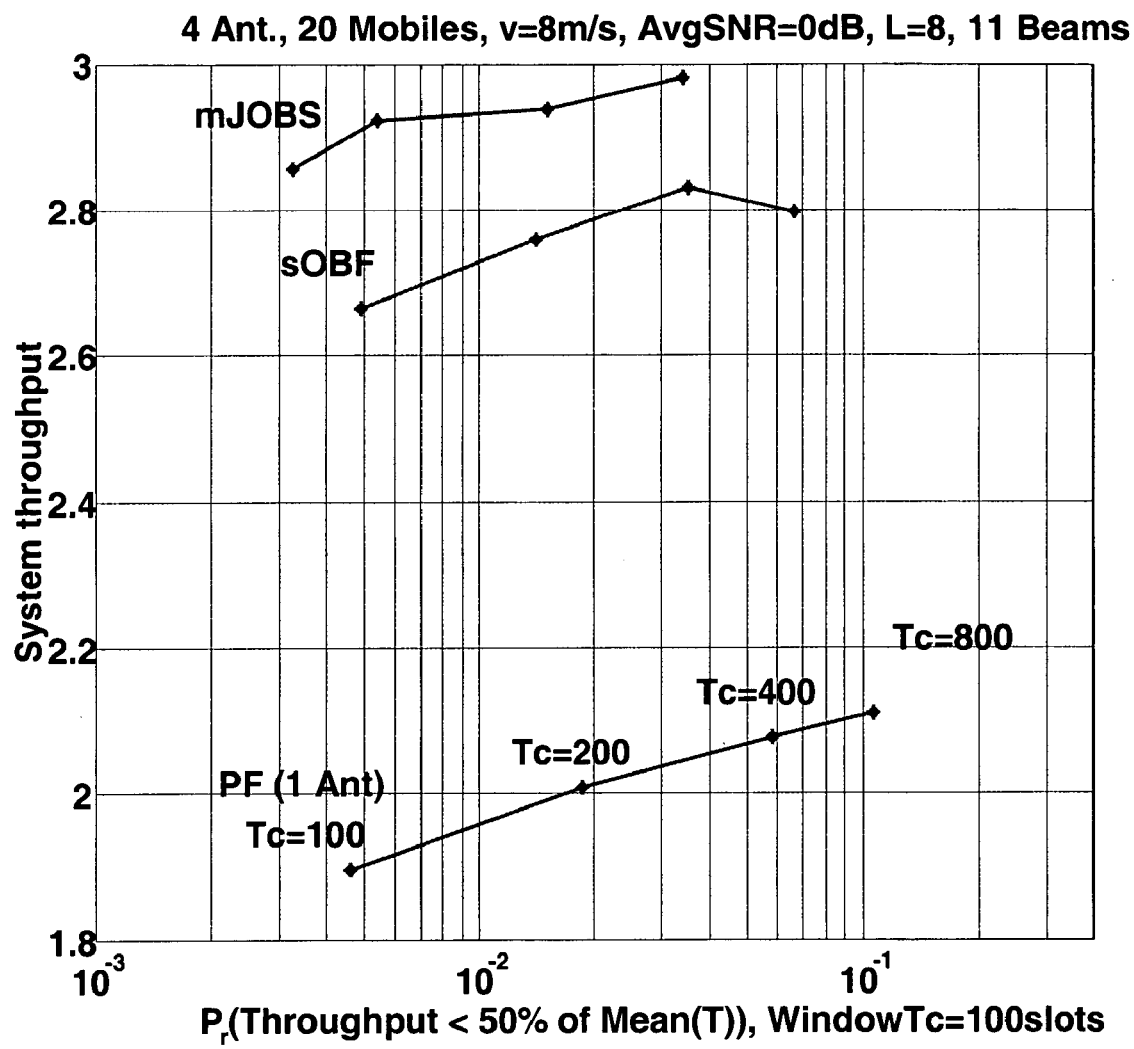
FIG. 10 is a graph illustrating system throughput versus a probability of a short term throughput falling below 50% of a long term throughput in accordance with an exemplary embodiment of the invention.

FIG. 10 is a graph illustrating system throughput versus a probability of a short term throughput falling below 50% of a long term throughput in accordance with an exemplary embodiment of the invention. To test the performance of the JOBS algorithm with a more general measure of delay (a different performance metric), the inventors reconfigured the preferred beam algorithm so that preferred beam algorithm generates the beam preferred by the MS having the lowest ratio of short term throughput to long term (or average) throughput. The inventors then simulated the system's throughput versus the probability that the short term throughput, filtered with $T_c=100$, falls below 50% of the long term throughput. The results are shown in FIG. 10. Even for this different metric, the JOBS algorithm appears to be more robust than sOBF.

Accordingly, combining beamforming with scheduling as described above may help to ensure that MSs being served in a given cell or sector of a cellular wireless communication system are served fairly and regularly. Giving priority to a selected MS (whether selected as the longest waiting MS or based on another criteria) reduces the probability of long interruptions in receiving packets by the MSs, or periods of degraded service (long droughts), as the case may be, for example, improving overall system throughput while meeting system delay constraints.

In accordance with the exemplary embodiments of the present invention, a preferred beam may be determined using system state information. In other words, no excess or additional signaling is needed. This may provide an improvement over the sOBF algorithm, which is run independent of system state information and thus receives no system state information as inputs, since beams are generated in a sequential or specified order to illuminate a cell or sector.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

We claim:

1. A method of determining a beam to be generated for transmitting information to a user, comprising:
    selecting a user from a user population based on a parameter that is tracked for each user in the user population; and
    determining a preferred beam to be generated for the selected user; and wherein
    the tracked parameter is a waiting time for each user that represents a duration of time since the user has received its last packet; and
    the selecting step further includes,
        initializing a timeslot counter, for a given timeslot, emptying an exclusion window,
        the exclusion window configured for preventing a beam from continually illuminating a user having poor channel conditions, and
        searching, at the beginning of the given timeslot, the user population for the longest waiting user that is outside the exclusion window.

2. The method of claim 1, wherein the steps of searching and determining may be iteratively repeated to determine a preferred beam to be generated for the longest waiting user in each timeslot.

3. The method of claim 1, wherein the determining step includes determining the preferred beam to be generated based on past information received from the selected user.

4. The method of claim 3, wherein the determining step includes, for a given timeslot:
    determining a running average data rate for each beam of a finite plurality of selectable beams based on past reports that, for each beam, have been previously received from the selected user, and
    selecting a beam having the highest running average data rate as the preferred beam.

5. The method of claim 1, further comprising updating information for determining a preferred beam for a given user in a current timeslot based on information used for determining the preferred beam in the previous timeslot.

6. A method of scheduling a user for receiving a transmission, comprising:
    selecting a user from a user population based on a parameter that is tracked for each user in the user population;
    generating a preferred beam for the selected user; and
    scheduling a user in the user population to receive a next transmission, based on the preferred beam; and wherein
    the tracked parameter is a waiting time for each user that represents a duration of time since the user has received its last packet; and
    the selecting step further includes,
        initializing a timeslot counter, for a given timeslot, emptying an exclusion window,
        the exclusion window configured for preventing a beam from continually illuminating a user having poor channel conditions, and
        searching, at the beginning of the given timeslot, the user population for the longest waiting user that is outside the exclusion window.

7. The method of claim 6, wherein the step of generating further includes:
    determining a running average data rate for each beam of a finite plurality of selectable beams based on past reports that, for each beam, have been previously received from the selected user, and
    selecting a beam having the highest running average data rate as the preferred beam.

8. The method of claim 6, wherein the step of scheduling further includes:
    transmitting a pilot signal to the user population using the preferred beam;
    receiving feedback from each user of the user population, the feedback including information relates to a maximum supportable data rate for the user; and
    running a scheduling algorithm to prioritize the user population for receiving a next transmission in a current timeslot.

9. The method of claim 8, wherein the selected user has been moved up in priority to receive the next transmission based on its feedback, the selected user's maximum supportable data rate corresponding to the preferred beam.

10. A method of transmitting information to a user, comprising:
    (a) initializing, at the beginning of a given timeslot, a timeslot counter and an exclusion window that prevents a beam used for transmitting the information to a given user having poor channel conditions from continually illuminating the user;
    (b) searching, within the given timeslot, the user population for a longest waiting user that is outside the exclusion window as a selected user;
    (c) generating a preferred beam for the selected user;
    (d) receiving reports from each user in the user population in response to a pilot signal transmitted using the preferred beam, each report including a maximum supportable data rates for the user;
    (e) running a scheduling algorithm based on the received reports to select a winning user;
    (f) transmitting information to the winning user using the preferred beam; and
    (g) updating the timeslot counter and exclusion window counter.

11. The method of claim 10, further comprising:
    (h) iteratively repeating steps (b) through (g) in subsequent timeslots.

12. The method of claim 10, wherein step (c) further includes:
    determining a running average data rate for each beam of a finite plurality of selectable beams based on past reports that, for each beam, have been previously received from the selected user, and
    selecting a beam having the highest running average data rate as the preferred beam.

13. The method of claim 10, wherein generating the preferred beam is designed to enhance the selected user's priority to receive the next transmission based on maximum supportable data rate information contained in the selected user's feedback.

* * * * *